United States Patent [19]

Kohne, Jr. et al.

[11] 3,897,300

[45] July 29, 1975

[54] PAPER FILLED WITH A BLUSHED PARTICULATE POLYSTYRENE PIGMENT

[75] Inventors: Harry F. Kohne, Jr., Glenwood; Frederick L. Kurrle, Laurel, both of Md.

[73] Assignee: Westvaco Corporation, New York, N.Y.

[22] Filed: Aug. 15, 1973

[21] Appl. No.: 388,369

Related U.S. Application Data

[62] Division of Ser. No. 196,199, Nov. 5, 1971, Pat. No. 3,775,353.

[52] U.S. Cl. ............................................. 162/169
[51] Int. Cl.$^2$ ......................................... O21H 3/40
[58] Field of Search .......... 162/169, 162; 260/2.5 B; 117/155 UA; 264/11; 106/788 Q

[56] References Cited
UNITED STATES PATENTS

| | | | |
|---|---|---|---|
| 3,441,473 | 4/1969 | Brundige et al. | 162/146 |
| 3,595,823 | 7/1971 | Huang | 260/29.6 T |
| 3,597,312 | 8/1971 | Kohne, Jr. et al. | 162/146 |
| 3,620,806 | 11/1971 | Kohne, Jr. et al. | 117/63 |
| 3,740,356 | 6/1973 | Munoa et al. | 260/2.5 B |
| 3,779,800 | 12/1973 | Heiser | 117/155 UA |

FOREIGN PATENTS OR APPLICATIONS

1,229,503   4/1971   United Kingdom

*Primary Examiner*—S. Leon Bashore
*Assistant Examiner*—William E. Smith

[57] ABSTRACT

A novel process is disclosed for converting a polystyrene or polystyreneacrylonitrile latex emulsion into a novel product comprising a white, opaque pigment for use as a paper filler, a paper coating pigment, a paint pigment, or for any other application where optimum optical effects are desired. The process comprises the high shear mixing of a polystyrene-containing aqueous emulsion with a swelling agent which penetrates the polymer or copolymer particle thereby causing it to swell, and then a final step for setting the particle in its swollen state. When using a partially water miscible swelling agent, the emulsion may be washed and filtered to remove the swelling agent from the particle thereby setting it in the swollen state, but for an essentially non-water miscible swelling agent, the emulsion need only be filtered and dried to set the swollen particles, and, where removal of the swelling agent is not necessary, the treated emulsion may be used without the filtering or drying steps.

1 Claim, No Drawings

PAPER FILLED WITH A BLUSHED PARTICULATE POLYSTYRENE PIGMENT

This application is a division of the copending application Ser. No. 196,199, filed Nov. 5, 1971 now U.S. Pat. No. 3,775,353.

SUMMARY OF INVENTION

This invention relates to compositions of matter, processes for their production, and products produced therewith. More particularly, the invention relates to novel and useful pigmentary white, bright and opaque synthetic filler materials, methods for producing the novel fillers and products produced using the filler materials. The invention is described in detail for use as a filler material in paper manufacture and as used in coatings for high quality papers.

Fillers are added to paper to improve both the optical and the physical properties. The principal object in filling is to increase the opacity and brightness of the paper, and the next most important object is to improve the smoothness, finish and printability of the sheet, particularly after calendering. Thus, in accordance with the present invention, it was found that a polystyrene latex emulsion particle could be swollen with an organic swelling agent under high shear mixing to produce a blushed pigmentary filler material displaying high optical efficiency when the swollen particle was set in its swollen state. The term "blushed," as used in the present disclosure, is a recognized term in the art and relates to a phenomenon disclosed for instance in U.S. Pat. No. 3,441,473 assigned to the assignee herein. The resulting blushed, polystyrene pigment differs considerably from normal high opacity fillers, such as $TiO_2$, in that it does not have a high refractive index, but it possesses high capacity, as shown by its light scattering coefficient.

Accordingly, with the trends in the paper industry toward lighter weight printing papers, it has become necessary to find a means for maintaining in light weight sheets the optical properties normally found in heavier weight papers. Therefore, the pigment disclosed herein may be considered as an alternate to $TiO_2$ for papers requiring high optics.

The preferred method of preparing the novel pigmentary filler material disclosed herein consists of the high shear mixing of a polystyrene-containing aqueous emulsion with a swelling agent for polystyrene. The swelling agent penetrates the resin particles in the emulsion causing the particles to swell, and these swollen particles are then set in their swollen state by one of several different treatments depending upon the type of swelling agent used. For a partially water miscible swelling agent, a washing and filtering step is used to remove the swelling agent from the particles and set them in their swollen state. In the case of a swelling agent which is essentially non-water miscible, the system is mixed to achieve maximum penetration and swelling of the polymer or copolymer particles and, the emulsion is then filtered and dried at 60°C. or below before end use. Finally, in systems where removal of the swelling agent is not necessary the treated emulsion system may be used without either filtering or drying the product.

In preparing the blushed pigment, the ultimate particle dimensions are determined by the particle size of the starting material and the degree of swelling permitted during the process. As described throughout the present disclosure, the process yields an average particle size in the range from about 0.1 to 0.2 micron. When using a partially water miscible swelling agent for polystyrene, such as methyl ethyl ketone, or, ethyl acetate, the aqueous polystyrene emulsion is charged to a high shear mixer such as a Waring Blendor or Kady Mill, mixing is initiated and the swelling agent is added to the emulsion system. With the partially water miscible swelling agent, the concentration required is dependent on its water miscibility. Thus the greater the water miscibility, the greater the swelling agent concentration necessary since a portion of the swelling agent tends to become distributed in the external water phase of the emulsion. Subsequently, after the external water phase is saturated, there is additional swelling agent available to penetrate the polymer or copolymer particle causing it to swell. The swelling proceeds to a point where large viscosity increases cause the formation of a smooth paste. At this point, additional water is added to the system for dilution to reduce the viscosity and to remove a portion of the swelling agent from the swollen polystyrene particles. Again, there is another gradual increase in viscosity with mixing, but the increase does not proceed to the formation of a smooth paste as before. After additional mixing, during which time greater swelling of the particles occurs, the porous pigment is then filtered and washed for removal of the remaining swelling agent. The latter step is accomplished by diluting the emulsion-swelling agent system with enough water to permit the external water phase to dissolve the entire amount of swelling agent previously introduced into the system. Finally, the emulsion is filtered and washed with water to set the pigment particles in their blushed, swollen state for ultimate use.

In lieu of the above described water dilution and washing, a water miscible alcohol, such as methanol, which is not a solvent for the polymer may be used to remove the water miscible swelling agent from the polymer particles. In this last mentioned case, a portion of the emulsifier and swelling agent-water phase will pass through the filter and the pigment will be retained on the filter cloth or filter paper. The pigment thus obtained may then be dried or it may be stored as a wet cake until used.

When the invention disclosed herein is practiced with a swelling agent that is essentially non-water miscible the pigment preparation procedure can be simplified. Such swelling agents as kerosene, VM&P (Varnish Makers' & Painters') naphtha, toluene and heptane are applicable. In these instances, the swelling agent is added to the emulsion in a manner identical to the method described hereinbefore using a high shear mixing vessel. Since the swelling agent is not water miscible, none will become distributed in the external water phase, but the swelling agent will penetrate and swell the polystyrene polymer or copolymer particles. This process results in a mixture having a lower swelling agent concentration since none of the swelling agent becomes a part of the external phase. For this system, the combined emulsion and swelling agent is thoroughly mixed to achieve maximum penetration and swelling of the polymer or copolymer particles. Finally, the emulsion is filtered and the swollen pigment particles obtained are stored in the emulsion state as a wet cake, or, dried at 60°C. or lower, before ultimate use.

In systems where removal of the swelling agent is not necessary, the treated emulsion may be used without the filtering or drying steps. However, with this latter method of pigment preparation, where a true solvent for the polystyrene emulsion is used as the swelling agent, the concentration of the swelling agent must not be too high or the polymer particles will become swollen and softened to a point where a complete collapse of the swollen structure will occur when the pigment is dried. If so, the dried and collapsed pore structure will result in the formation of a clear film.

Colored pigments may also be formed using the process of the present invention by the incorporation of oil-based dyestuffs, that are soluble in the swelling agent, into the swelling agent prior to its addition to the mixing vessel. A pigment of any desired color can be produced in this manner. The dissolved dyestuff will tend to penetrate the polymer or copolymer particles with the swelling agent. Further, since dyestuffs of the above noted type are not water soluble, the dyestuff does not tend to bleed from the pigment particles in an aqueous system.

In order to determine the properties of the novel pigment produced by the present invention, batches of the pigment were prepared for evaluation of the product on the paper machine as a wet end pigment additive. Measurements were taken of the opacity and brightness of the sheets produced and the scattering coefficient was calculated. These measurements were then compared with similar determination of unfilled pulp sheets and of sheets filled with $TiO_2$ and clay.

It is known that white fillers greatly increase the opacity of average paper, and at the same time, they also increase the brightness. The opacifying and brightening effects are determined by the amount of light scattered, reflected and absorbed by the pigment. Generally the opacity increases as the particle size of the pigment is decreased until an optimum size is reached, since smaller particles have more surface planes through which the light must pass and be refracted or reflected. Moreover, the increase in brightness obtained by filling depends partially on the original brightness of the pigment and upon the particle size and covering power of the pigment.

However, in comparison tests with the improved optical pigmentary filler material disclosed herein, it was found that each of the values for brightness, opacity and scattering coefficient approached those obtained by using a like amount of $TiO_2$. Moreover, with the polystyrene pigment in the furnish, a bulkier sheet was obtained at slightly less retention than with $TiO_2$.

Other determinations of the utility of the novel pigmentary material disclosed herein were made by preparing separate coatings containing the polystyrene pigment, clay and $TiO_2$. Comparitive measurements were then made of the brightness, opacity and scattering coefficient of the different coatings and it was found that the polystyrene pigment performed nearly as well as $TiO_2$ and substantially better than the coatings containing clay.

Clay, of course, accounts for the largest percentage of pigment used in paper coatings, but for high quality papers, $TiO_2$ is used. Titanium pigments are generally added to clay coatings to increase the opacity, brightness and whiteness of the coatings. They give more opacity in relation to the amount of pigment used than any other conventional pigment, but, the high cost of $TiO_2$ pigments restrict their use. The polystyrene pigment disclosed herein is somewhat less expensive than $TiO_2$ and exhibits a compatibility with other ingredients in coating mixtures while yielding optical results nearly as good as $TiO_2$.

The scattering coefficient (Kubelka-Munk), an indication of opacifying power, can be as high as 0.64 for sheets containing the polystyrene pigment of the present invention, thus yielding an opacity substantially greater than that normally obtained with conventional papermaking filler pigments. The scattering coefficient for conventional filler clay in a basestock is normally about 0.18, and for basestocks containing $TiO_2$ about 0.73. Accordingly, the purpose of the present invention is to produce a suitable replacement for both clay and $TiO_2$ pigments where used as either a filler or coating material.

DETAILED DESCRIPTION

The invention will now be described in more detail with the aid of the following examples:

EXAMPLE I

Paper machine trials were made to compare the properties of the polystyrene pigment directly with $TiO_2$. The polystyrene pigment was prepared in batches by charging a Waring blendor with 100 ml. of an aqueous emulsion of Dow SD-188 polystyrene at 40.0% solids. The emulsion was then agitated at 14,000 rpm, and immediately thereafter, 25 ml. of ethyl acetate, a true solvent for polystyrene, (water solubility 8.6 g./100 ml.) was added to the emulsion from a graduated cylinder. The average time for initial thickening of the emulsion into a smooth paste was 46 seconds. An additional 100 ml. of water was then added to the mixture and agitation was continued for 5 minutes. After this time period, each batch was diluted in an excess of water, filtered and washed. Enough batches were prepared for evaluation of the product as a wet end pigment additive.

Therefore, the pigment was compared with $TiO_2$ on a paper machine. The pulp furnish, Luke "Hi-Brite," 70% hardwood and 30% softwood, was beaten to 100 seconds Williams freeness and a paper machine run was made with 100% of this pulp as a control. The paper machine runs for comparing the polystyrene and $TiO_2$ consisted of 90% "Hi-Brite" pulp and 10% $TiO_2$ in the first case, and, 90% "Hi-Brite" pulp and 10% polystyrene in the second case. Data from these machine trials are shown below in Tables 1 and 2.

TABLE 1

| | Optical Data - Filler Pigment | | | |
|---|---|---|---|---|
| | 100% Pulp | 17.4% Clay in furnish | 10% $TiO_2$ in furnish | 10% P.S. in furnish |
| Basis wt. | 31.9 | 34.1 | 29.7 | 30.4 |
| Caliper | .0036 | .0040 | .0036 | .0040 |
| % Filler | — | 7.29 | 5.74 | 4.66 |
| LRL Brightness | 83.5 | 81.8 | 87.1 | 86.6 |
| B & L Opacity | 71.5 | 77.7 | 81.8 | 79.6 |
| Scat. Coeff. | — | .181 | .735 | .641 |

The runnability of the blushed polystyrene pigment on the paper machine was excellent. There was no evidence of foam development and the sheet formation was excellent. The optical results indicated that polystyreene was nearly equivalent to $TiO_2$ with respective scattering coefficients of 0.641 and 0.735. Moreover, the polystyrene filled sheet demonstrated a much higher scattering coefficient than the clay filled sheet. Wet end retention data indicated a single pass retention for the polystyrene pigment of 46.6% compared with 57.4% retention for $TiO_2$ and 41.9% for clay. Furthermore, the caliper data reproduced in Table 1 shows a bulkier sheet with the polystyrene filler.

TABLE 2

Strength Comparisons of Filler Pigments

| | | 100% Pulp | 17.4% Clay in furnish | 10% $TiO_2$ in furnish | 10% P.S. in furnish |
|---|---|---|---|---|---|
| Burst | | 16 | 12 | 11 | 9 |
| Tear | MD | 31 | 28 | 27 | 27 |
| | CD | 42 | 37 | 34 | 37 |
| Fold | MD | 28 | 16 | 15 | 8 |
| | CD | 8 | 5 | 3 | 3 |
| Tensile | MD | 11 | 9 | 8 | 7 |
| | CD | 4 | 4 | 3 | 3 |
| % Filler | | — | 7.29 | 6.74 | 4.66 |

The data in Table 2 illustrates that with the use of any filler material, there will be a reduction in strength of the sheet as compared with the 100% pulp control because of the reduction in the fiber bonding that would normally occur between the paper making fibers in the absence of a filler. However, none of the filler materials show a clear advantage, and it is apparent from the data in Table 1 that the novel blushed polystyrene pigment disclosed herein does perform as a filler material with an optical efficiency which is much better than clay and nearly as good as $TiO_2$.

EXAMPLE II

To determine the feasibility of using the novel blushed organic polystyrene pigment in a paper coating formulation, coater trials were conducted using coatings containing 100% $TiO_2$, 100% clay and 100% blushed polystyrene. At the same time, hand drawdowns were made on cellophane with the polystyrene and $TiO_2$ formulations in order to determine their respective optical efficiencies.

For this purpose, the polystyrene pigment was prepared in the same manner outlined under Example I.

The coating formulations used in the comparative study are set forth in Table 3.

The solids content for the clay coating (No. 1) and the $TiO_2$ coating (No. 2) were substantially the same, however, the solids content for the polystyrene coating (No. 3) had to be reduced because of the high viscosity of the coating formulation obtained when the polystyrene was added. This higher viscosity with the blushed polystyrene pigment was attributed to the larger surface area per unit weight for the polystyrene. Accordingly, a higher binder concentration was required for the polystyrene pigment coating.

Table 4 shows the optical efficiency determinations for the $TiO_2$ and polystyrene coatings.

TABLE 4

| | Optical Data | | | |
|---|---|---|---|---|
| Condition | LRL Brightness | B & L Opacity | Coat Wt. (lbs./rm.) | Scattering Coefficient |
| Polystyrene | 91.9 | 83.1 | 14.4 | .21 |
| | 93.7 | 93.8 | 30.7 | .23 |
| $TiO_2$ (Anatase) | 89.4 | 67.5 | 8.4 | .18 |
| | 92.9 | 91.9 | 26.2 | .22 |

The data noted above was obtained from hand drawndowns with a Bird bar on cellophane. This data clearly illustrates that the blushed polystyrene pigment coating is as good or better than the $TiO_2$ coating as regards optical efficiency when either one is used as the only pigment in a coating formulation.

Subsequently, coatings prepared in accordance with Example II were applied to a 40 pound basestock with an inverted trailing knife coater at 50 ft./min. The optical results are shown below in Table 5.

TABLE 5

| Condition | Optical Data Coat Wt. (lbs./rm.) | LRL Brightness | B & L Opacity |
|---|---|---|---|
| Basestock | — | 79.5 | 79.4 |
| Polystyrene (No. 3) (CIS) | 2.7 | 84.6 | 85.4 |
| $TiO_2$ (CIS) (No. 2) | 4.6 | 86.5 | 88.3 |
| Clay (CIS) (No. 1) | 4.5 | 81.1 | 84.8 |

No noticeable problems were encountered with the runnability of the polystyrene pigment coating. However, it was necessary to prepare the polystyrene coating at the before mentioned lower solids level due to its relatively high viscosity. Accordingly, due to the coating solids difference, the coat weight of the blushed polystyrene coating was lower than for either the clay

TABLE 3

| Formulation No. | Coating Data Component | Concentration (parts) | Formulation Solids (%) |
|---|---|---|---|
| 1 | Hydrasperse No. 2 Coating | 100 | 50.8 |
| | Clinton 718 D Starch | 18 | |
| 2 | DuPont "Ti-Pure" $TiO_2$ | 100 | 52.7 |
| | Clinton 718 D Starch | 18 | |
| 3 | Polystyrene Pigment No. 873 | 100 | 26.4 |
| | Clinton 718 D Starch | 40 | |
| | Vinol 125 | | | coated paper or the $TiO_2$ coated paper. Notwithstanding this difference, the sheet optics of the polystyrene coated sheet were significantly better than the clay coated sheet even at the lower pickup.

EXAMPLE III

In this example, evidence was obtained to show the effects on the optical efficiency of the polystyrene emulsion induced by treatment with a swelling agent to produce the novel polystyrene pigment disclosed herein. For this purpose, the untreated aqueous polystyrene emulsion, Dow SD-188, was mixed with 2% sodium carboxymethylcellulose as a binder, and drawdowns were made on cellophane at two different coat weights. Optical data was then taken for this coating.

Next, the procedure outlined in Example I was followed to prepare a polystyrene pigment from the same Dow SD-188 aqueous emulsion, by treating the emulsion with ethyl acetate as the swelling agent to swell and set the polystyrene pigment particles. This treated emulsion was then mixed with a 2% solution of sodium carboxymethylcellulose as a binder, and hand drawdowns of this coating composition were then made on cellophane at two different coat weights. The optical data comparison is shown in Table 6.

TABLE 6

| Condition | Coat Wt. (lbs./rm.) | LRL Brightness | B & L Opacity | Scattering Coefficient |
|---|---|---|---|---|
| Untreated Emulsion | 2.0 | 66.6 | 12.8 | .06 |
| Polystyrene Pigment | 2.3 | 84.4 | 55.2 | .41 |
| Untreated Emulsion | 14.3 | 75.4 | 29.0 | .02 |
| Polystyrene Pigment | 12.0 | 94.2 | 91.9 | .48 |

The above data indicates that large brightness and opacity increases result when the untreated emulsion is treated in accordance with the present invention to form the swollen polystyrene particles described. In addition, the results show that larger relative increases in brightness and opacity may be expected at heavier coat weights. The values for scattering coefficient reflect the relative efficiencies of the untreated and treated polystyrene spheres.

EXAMPLE IV

To determine the effectiveness of the synthetic blushed polystyrene pigments in copolymer form, and, using a different swelling agent, an aqueous copolymer latex of 83% polystyrene, 17% acrylonitrite at 30.5% solids was used to prepare the blushed organic filler. In this experiment, increasing concentrations of the swelling agent VM&P naphtha were metered into 100 ml. of the copolymer latex in a Waring blender, with the mixing continuing for 5 minutes at 14,000 rpm. The treated emulsions were then combined with Dow 620 latex binder (25 parts Dow/100 parts polystyrene acrylonitrile) and drawdowns were made on cellophane to determine the optical properties achieved. The results are shown in Table 7 below.

TABLE 7

| VM & P Concentration | LRL Brightness | B & L Opacity | Coat Wt. (lbs./rm.) | Scattering Coefficient |
|---|---|---|---|---|
| ml. 0 | 83.7 | 48.5 | 6.4 | .12 |

TABLE 7-Continued

| VM & P Concentration | LRL Brightness | B & L Opacity | Coat Wt. (lbs./rm.) | Scattering Coefficient |
|---|---|---|---|---|
| 5 | 88.0 | 63.0 | 8.8 | .15 |
| 10 | 86.0 | 57.7 | 5.7 | .19 |
| 20 | 93.3 | 88.8 | 16.6 | .26 |
| 30 | 91.3 | 76.2 | 5.3 | .43 |
| 40 | 90.6 | 79.1 | 5.3 | .49 |
| 50 | 92.9 | 86.1 | 7.9 | .49 |
| 60 | 90.2 | 75.1 | 4.2 | .51 |

Thus the data shows that with increased concentrations of VM&P naphtha, the optical efficiency of the copolymer increases up to about 40 ml. level. Accordingly, this example illustrates that a copolymer of polystyrene may be made to perform satisfactorily in carrying out the present invention.

EXAMPLE V

For this example, the optimum condition of 40 ml. of VM&P naphtha was used with the same copolymer emulsion of Example IV to prepare the blushed pigment disclosed herein. The pigment was then combined in separate trials with 18 parts of Clinton 718 D starch per 100 parts pigment, and 18 parts Dow 620 latex per 100 parts pigment. Drawdowns were made on cellophane and the optical properties determined as set forth below in Tables 8 and 9.

TABLE 8

| Condition | LRL Brightness | B & L Opacity | Coat Wt. (lbs./rm.) | Scattering Coefficient |
|---|---|---|---|---|
| 100% Clay | 73.6 | 52.0 | 7.6 | .10 |
| 100% TiO₂ | 87.1 | 69.2 | 4.9 | .33 |
| 100% P.S. | 90.7 | 78.0 | 4.8 | .50 |
| 70% Clay-30% TiO₂ | 79.5 | 56.0 | 5.2 | .18 |
| 70% Clay-30% P.S. | 84.1 | 67.3 | 6.1 | .24 |
| 80% Clay-20% TiO₂ | 77.7 | 52.7 | 4.8 | .17 |
| 80% Clay-20% P.S. | 80.7 | 60.9 | 5.4 | .21 |
| 90% Clay-10% TiO₂ | 75.7 | 47.1 | 4.5 | .15 |
| 90% Clay-10% P.S. | 77.4 | 55.2 | 5.6 | .17 |

Note: All coatings contained 18 pts. Dow 620 latex/100 pts. pigment.

TABLE 9

| Condition | LRL Brightness | B & L Opacity | Coat Wt. (lbs./rm.) | Scattering Coefficient |
|---|---|---|---|---|
| 100% Clay | 74.7 | 50.1 | 5.9 | .13 |
| 100% TiO₂ | 85.7 | 63.1 | 3.7 | .35 |
| 100% P.S. | 88.0 | 67.8 | 2.4 | .65 |
| 70% Clay-30% TiO₂ | 82.0 | 64.2 | 4.5 | .29 |
| 70% Clay-30% P.S. | 84.0 | 66.8 | 4.6 | .32 |
| 80% Clay-20% TiO₂ | 81.1 | 65.9 | 6.5 | .21 |
| 80% Clay-20% P.S. | 82.1 | 63.1 | 5.1 | .25 |
| 90% Clay-10% TiO₂ | 78.7 | 61.2 | 6.5 | .18 |
| 90% Clay-10% P.S. | 79.0 | 56.9 | 4.8 | .20 |

Note: All coatings contained 18 pts. Clinton 718D starch/100 pts. pigment.

The above data indicates that the optical efficiency of a coating containing 100% of the blushed polystyrene copolymer pigment is superior to both the 100% clay coating and 100% TiO₂ coating. Moreover, the data also shows that when the blushed polystyrene copolymer pigment is applied at reduced levels in combination with clay, optical advantages are obtained in each case when compared with similar combinations of $TiO_2$ and clay. In each case, the brightness, opacity and scattering coefficient for the coatings containing polystyrene were higher than for the $TiO_2$ coatings. Thus one practical approach to using the blushed polystyrene pigment of the present invention in a paper coating formulation would be to use the pigment as a partial substitute for clay.

EXAMPLE VI

In order to measure the optical efficiency before and after calendering of the blushed polystyrene pigment as prepared in Example IV, when applied in a coating formulation to a paper basestock, a large batch of the aqueous copolymer latex emulsion (83% polystyrene, 17% acrylonitrile) was prepared in a 10 gallon Kady Mill. At a solids of 39.5%, mixing was initiated and 3.2 liters of the swelling agent VM&P naphtha were added. This batch was mixed for a total of 15 minutes after which the treated emulsion was used in the preparation of coating colors. The coating formulations varied slightly in each case depending upon the ingredients, and comparisons were made by coating a 30 lb./ream basestock on an inverted trailing knife coater. The results of the tests are shown in Table 10.

TABLE 10

Optical and Physical Test Results
Uncalendered

| Condition | LRL Brightness | B & L Opacity | Bekk (sec.) | Caliper |
|---|---|---|---|---|
| Rawstock | 63.4 | 82.8 | 77 | .0022 |
| 100% Clay | 65.7 | 83.7 | 23 | .0025 |
| 100% TiO₂ | 74.4 | 91.7 | 22 | .0025 |
| 100% P.S. | 70.9 | 89.2 | 84 | .0024 |
| 80% Clay-20% P.S. | 69.9 | 88.0 | 65 | .0024 |
| 80% Clay-20% TiO₂ | 69.8 | 89.0 | 26 | .0025 |

Calendered

| Calendering | 100% Clay 6 nips 180 pli | 100% TiO₂ 6 nips 1800 pli | 100% P.S. 2 nips 400 pli | 80% Clay 20% P.S. 2 nips 800 pli | 80% Clay 20% TiO₂ 6 nips 1800 pli |
|---|---|---|---|---|---|
| Gloss | 23 | 20 | 24 | 27 | 24 |
| LRL Brightness | 63.1 | 73.5 | 69.9 | 68.3 | 67.9 |
| B & L Opacity | 83.6 | 91.1 | 88.8 | 88.2 | 87.4 |
| Bekk (sec.) | 891 | 656 | 251 | 463 | 840 |
| Caliper | .0019 | .0019 | .0022 | .0021 | .0020 |
| Coat Wt. | 3.1 | 5.2 | 2.0 | 4.2 | 4.4 |

No problems were encountered in the coater operations on any of the runs, however a lower coat weight resulted with the 100% blushed polystyrene coating than with the 100% clay or 100TiO₂ coatings. Notwithstanding this difference, the optical properties of the sheets having the blushed polystyrene coating were nearly comparable with the sheets having the $TiO_2$ coating, and, substantially better than the sheets having the clay coating.

The supercalendered data indicates the characteristic differences in the finishing ability of the paper having the blushed polystyrene pigment coating as compared with the other sheets having coatings containing the inorganic pigments $TiO_2$ and clay. The data shows that for the coated paper comparisons, the sheets which were coated with the blushed polystyrene pigment were calendered at less than half the loadings of the other coated papers in order to achieve a comparable gloss finish. Thus paper when coated with a coating containing the blushed polystyrene pigment of the present invention retains its good optical properties after supercalendering and requires only light calendering action to achieve a good gloss.

EXAMPLE VII

In order to show the level of optical efficiency achieved by treating the aqueous emulsion used in Example VI, a small Waring blendor batch of the blushed pigment was prepared as outlined in Example VI and used to make drawdowns on cellophane with 2% sodium carboxymethylcellulose as binder. The optical data from the treated emulsion was then compared with the optical data taken from an untreated sample of the emulsion as shown in Table 11.

TABLE 11

| Condition | LRL Brightness | B & L Opacity | Coat Weight | Scattering Coefficient |
|---|---|---|---|---|
| Untreated Emulsion | 72.8 | 17.4 | 2.5 | .07 |
| Polystyrene Pigment | 90.4 | 67.7 | 3.5 | .45 |
| Untreated Emulsion | 82.9 | 41.1 | 14.4 | .04 |
| Polystyrene Pigment | 95.2 | 89.8 | 11.7 | .42 |

The results of the drawdowns reproduced above show that a large increase in optical efficiency is obtained by treating the polystyrene as described herein.

Finally, in order to compare the results obtained with the treatment described herein using different swelling agents, the trials set forth below were conducted.

EXAMPLE VIII

In these trials, 100% toluene, 100% heptane and combinations of these organic liquids were used as the swelling agents to prepare samples of the synthetic, opaque pigment described herein. The same Waring blendor mixing procedure used in the prior examples was followed, and an aqueous copolymer latex of 83% polystyrene and 17% acrylonitrile at 39.5% solids was used to prepare the blushed organic filler. The products obtained were then combined with 25 parts Dow 620 latex per 100 parts of the treated pigment. Drawdowns were then made on cellophane and the data reproduced in Table 12 below shows the wide range of optical properties obtained by using the various swelling agent combinations set forth.

TABLE 12

83% Polystyrene —17% Acrylonitrile Concentration —100 ml.

| Toluene Conc. (ml.) | Heptane Conc. (ml.) | Mixing Time (mins.) | LRL Brightness | B & L Opacity | Coat Weight | Scattering Coefficient |
|---|---|---|---|---|---|---|
| 0 | 40 | 6 | 91.3 | 82.2 | 10.3 | .30 |
| 4 | 36 | 6 | 92.5 | 85.3 | 10.5 | .34 |
| 8 | 32 | 3 | 92.7 | 88.0 | 10.5 | .40 |
| 12 | 28 | 1.5 | 91.9 | 86.5 | 10.5 | .36 |
| 28 | 12 | 6 | 74.6 | 39.5 | 10.3 | .05 |
| 40 | 0 | 6 | 67.3 | 22.4 | 10.3 | .02 |

The results show that the best optical results were obtained when the swelling agent mixture contained a majority of heptane. The optimum optical efficiency was obtained as shown with a mixture of 8 ml. toluene and 32 ml. heptane.

EXAMPLE IX

To observe any differences in the optical efficiency of the blushed pigment disclosed herein when used before and after drying, the following tests were performed. 100 ml of the aqueous copolymer emulsion (83% polystyrene-17% acrylonitrile) was treated in the standard manner with 40 ml. of VM&P naphtha as the swelling agent. The blushed pigment obtained was then used without filtering and drying to prepare a coating containing 80% clay and 20% blushed polystyrene pigment with 20 parts Clinton 718D starch as binder per 100 parts pigment.

In a second case, the batch was prepared, filtered and air dried. The dried pigment was then reslurried and used in an identical coating using 20 parts Clinton 718D starch per 100 parts pigment as the binder. The results of the comparison are shown in Table 13.

TABLE 13

| Condition | LRL Brightness | B & L Opacity | Coat Weight | Scattering Coefficient |
|---|---|---|---|---|
| Dried P.S. | 79.5 | 62.7 | 5.6 | .22 |
| Treated P.S. (not dried) | 80.1 | 60.8 | 4.8 | .24 |
| Dried P.S. | 82.3 | 86.3 | 21.2 | .15 |
| Treated P.S. (not dried) | 83.3 | 85.3 | 18.1 | .17 |

As noted in the above table, with the two coatings applied to cellophane, the optical results obtained reflected only a small difference in the optical efficiency of the blushed pigment before and after drying, even at different coat weights.

EXAMPLE X

Another experiment was conducted to show how a colored pigment could be produced according to the present invention. For this purpose, 0.30 grams of DuPont oil red powder was dissolved in 40 ml. of VM&P naphtha. The mixture was then added to 100 ml. of the aqueous copolymer emulsion (83% polystyrene-17% acrylonitrile) in a Waring blendor. Under agitation of 14,000 rpm, the VM&P naphtha containing the dissolved dyestuff was mixed for 5 minutes. The treatment produced a pink pigment that could be used in an aqueous system.

In determining the scattering coefficient for each filler material, the opacity of the handsheets containing the filler was first measured according to Tappi Standard T 425 with a B&L opacimeter. Reflectance of the handsheets was determined at 457 millimicrons using an LRL integrating sphere reflectometer. Control handsheets, similar in all respects to the filled sheets, except that they contained papermaking pulp only, were also tested for opacity. By using Tappi Data Sheet No. 65, which contains a graphical solution of the Kubelka-Munk equations relating Tappi opacity, bulk reflectance, and total light scattering power of the handsheet, the brightness of the sheets was obtained. Total light scattering power is defined as the product of the scattering coefficient and the basis weight of the handsheet, based on a 3,300 square feet ream.

The value for total light scattering power of the control was divided by the basis weight of the handsheet to arrive at the scattering coefficient of the papermaking pulp. To determine the total scattering power for the filler in a filled handsheet, the scattering coefficient for the pulp, as determined from the control, was multiplied by the weight of pulp in the filled sheet, and this value was subtracted from the total scattering power of the filled sheet to obtain the total scattering value for the filler portion of the sheet. The scattering coefficient for the filler was then determined by dividing the total scattering value for the filler by the basis weight of the filler in the handsheet. Scattering coefficients given throughout this specification were determined in the above-described manner.

From the above description, it can be seen that a useful and novel synthetic, blushed organic pigment may be produced using any one of several different blends of polymer or copolymer and swelling agents. Example I teaches the use of a standard aqueous polystyrene emulsion with a water miscible swelling agent to produce a pigment useful as a filler for paper. Example II outlines the use of the same pigment in a paper coating composition, while Example III illustrates the dramatic optical advantages achieved by treating the polystyrene emulsion as set forth herein. Example IV describes the process herein when the blushed pigment is produced from a copolymer of polystyrene using a non-water miscible swelling agent, and Example V sets forth the details of a trial using the optimum copolymer/swelling agent concentration of Example IV to produce a pigmented coating for paper. Example VI shows the optical efficiency obtained with the polystyrene copolymer as treated in Example IV, when used in a coating composition for paper both before and after calendering the paper, and, Example VII illustrates the optical advantages achieved by treating the copolymer emulsion of Example IV. Finally, Example VIII shows how the novel pigment may be produced with other non-water miscible swelling agents, while Example IX illustrates the results obtained when the pigment is used either before or after drying, and, Example X sets forth an experiment wherein a colored pigment is produced while practicing the present invention.

It is believed that the opacifying effect, developed by treating an aqueous polystyrene emulsion in accordance with the present invention, is obtained through the creation of air-solid interfaces within the blushed pigment particles. These interfaces are produced in the particles when the particles are set in their swollen and blushed state by washing the swelling agent from the expanded spherical particles with a non-solvent for polystyrene that is miscible with the swelling agent, or by the rapid evaporation of the swelling agent from the particles. In either case, the expanded polystyrene pigment is not allowed to shrink back to its original diameter. The result is, of course, to produce the optically efficient pigment disclosed herein.

Accordingly, the novel blushed, opaque organic filler material described herein is based on an entirely new concept. The high opacity produced by blushing the polystyrene pigment is surprising since the refractive index of polystyrene is not particularly high, being on the order of 1.6. Thus a refractive index of this low value would not suggest the high optical performance demonstrated by the pigment.

The unique properties of the organic pigment disclosed herein yields benefits in both paper quality and paper manufacture, and, could be used successfully in other environments such as paints. It is the sum of these benefits, which no inorganic pigment can offer, that enables paper makers to realize meaningful cost performance advantages, while permitting the development of new paper grades not previously possible.

While the invention has been described in greatest detail in terms of specific embodiments, it is to be understood that the invention is not intended to be limited to such details except insofar as they appear in the appended claims.

We claim:

1. Paper comprising cellulosic fibers and a synthetic, blushed polystyrene pigment filler prepared from a polystyrene emulsion, said blushed polystyrene pigment filler consisting essentially of spherical particles having an air-containing microporous structure as a result of air-solid interfaces within the filler particles and having a particle size of from about 0.1 to 0.2 micron and a scattering coefficient of about 0.64, said blushed polystyrene pigment being capable of increasing the B&L Opacity of a sheet of paper having an opacity of about 71 without said pigment by about 8 points when said paper is provided with about 4.66% by weight of said blushed pigment.

* * * * *